United States Patent
Corpron

(10) Patent No.: US 9,476,360 B2
(45) Date of Patent: Oct. 25, 2016

(54) METHOD OF AUTOMATICALLY REGULATING AIRCRAFT POWER PLANT GAS GENERATOR AND FREE TURBINE SPEEDS AS A FUNCTION OF HEATING, ELECTRICITY GENERATION, NOISE EMISSION, AND FUEL CONSUMPTION

(71) Applicant: AIRBUS HELICOPTERS, Marignane (FR)

(72) Inventor: Alban Corpron, Salon de Provence (FR)

(73) Assignee: Airbus Helicopters, Marignane (FR)

( * ) Notice: Subject to any disclaimer, the term of this patent is extended or adjusted under 35 U.S.C. 154(b) by 1007 days.

(21) Appl. No.: 13/753,690

(22) Filed: Jan. 30, 2013

(65) Prior Publication Data

US 2014/0020396 A1    Jan. 23, 2014

(30) Foreign Application Priority Data

Feb. 7, 2012 (FR) .................................. 12 00353

(51) Int. Cl.
   *F02C 9/00* (2006.01)
   *B64D 31/00* (2006.01)
   *F02C 9/28* (2006.01)
   *B64C 27/04* (2006.01)

(52) U.S. Cl.
   CPC ............... *F02C 9/00* (2013.01); *B64C 27/04* (2013.01); *B64D 31/00* (2013.01); *F02C 9/28* (2013.01); *F05D 2220/329* (2013.01); *F05D 2220/76* (2013.01); *F05D 2270/02* (2013.01)

(58) Field of Classification Search
   CPC .............. F02C 9/00; F02C 9/28; F02C 9/50; B64C 27/04; B64D 31/00; B64D 31/06; F05D 2220/329; F05D 2270/02; F05D 2270/071; F05D 2270/303

See application file for complete search history.

(56) References Cited

U.S. PATENT DOCUMENTS

| | | | |
|---|---|---|---|
| 4,500,966 A | 2/1985 | Zagranski | |
| 4,541,237 A | 9/1985 | Dickey | |
| 5,363,317 A | 11/1994 | Rice | |
| 5,403,155 A * | 4/1995 | Head et al. | ....... 416/25 |
| 6,282,882 B1 | 9/2001 | Dudd, Jr. | |
| 6,880,784 B1 | 4/2005 | Wilkinson | |
| 2011/0208400 A1 | 8/2011 | Lickfold | |

FOREIGN PATENT DOCUMENTS

WO      0039442 A2    7/2000

OTHER PUBLICATIONS

Search Report and Written opinion; Application No. FR 1200353; dated Oct. 4, 2012.

* cited by examiner

*Primary Examiner* — Phutthiwat Wongwian
*Assistant Examiner* — Marc Amar
(74) *Attorney, Agent, or Firm* — Brooks Kushman P.C.

(57) ABSTRACT

The present invention relates to an automatic method of regulating a power plant (3') of an aircraft (1), the power plant having at least one turbine engine (3), each engine (3) being capable of operating in an idling mode of operation. A calculation system (15) executes stored instructions in order to implement the idling mode of operation as a function of operational and ordered conditions either via a first regulation mode by regulating a first speed of rotation (Ng) of said gas generator (4), or via a second mode of regulation by regulating a second speed of rotation (NTL) of said free turbine (7).

13 Claims, 1 Drawing Sheet

METHOD OF AUTOMATICALLY REGULATING AIRCRAFT POWER PLANT GAS GENERATOR AND FREE TURBINE SPEEDS AS A FUNCTION OF HEATING, ELECTRICITY GENERATION, NOISE EMISSION, AND FUEL CONSUMPTION

CROSS REFERENCE TO RELATED APPLICATIONS

This application claims priority to French patent application No. FR 12 00353 filed on Feb. 7, 2012, the disclosure of which is incorporated in its entirety by reference herein.

BACKGROUND OF THE INVENTION (1) Field of the Invention

The present invention relates to a method of automatically regulating an aircraft power plant, to a device, and to an aircraft.

More particularly, the invention is applicable to a rotary-wing aircraft.

(2) Description of Related Art

Conventionally, a rotary wing aircraft is equipped with a power plant comprising at least one engine such as a piston engine or a turbine engine. Such a turbine engine may also be referred to as a "turboshaft engine".

A gearbox connects the power plant to the main advance and lift rotor: this is referred to as the "main gearbox" or "MGB".

Temperature limits for an engine and torque limits for an MGB serve to define an operating envelope for each engine that covers two normal utilization ratings:

a takeoff rating corresponding to a level of torque for the MGB and a level of heating for the engine that can be accepted for a limited length of time without significant degradation, this takeoff rating being defined by a maximum takeoff power PMD and by a duration for using this maximum takeoff power that is generally of the order of five minutes; and maximum continuous rating, which rating is defined by a maximum continuous power PMC corresponding to about 90% of the maximum takeoff power PMD, and by a utilization duration for said maximum continuous power that is generally unlimited.

In addition, manufacturers define an idling rating for minimizing fuel consumption, with the engine nevertheless continuing to keep running while idling.

The idling rating for an aircraft engine is a particular mode of operation enabling the engines of the aircraft to operate on the ground while minimizing the nuisance and/or while maximizing the comfort of the people and crew moving around the aircraft. In particular, the idling rating serves to:

keep the engine up to temperature for rapid departure;
minimize the noise emitted by the aircraft;
minimize pollutant emission and fuel consumption; and to
enable electricity to be generated on board and hot air to be taken for the purpose of heating and demisting the cabin.

The idling rating is therefore a relatively complex mode, having objectives that can be opposing and constrained. For example, the lift rotor of a helicopter must be driven by a turbine engine operating at an idling rating that is relatively low in order to minimize noise, but it is also necessary for the engine to have an idling rating that is relatively high in order to enable an electricity generator to operate.

The ratings enabling the aircraft to operate in flight are, for convenience, referred to as "flight ratings", whereas the rating enabling the engine to idle is referred to as the "idling rating".

The aircraft is then provided with a physical state selector having three stable positions. These three positions for the state selector are: engines stopped or "STOP"; engines in idling mode or "IDLE"; and engines in flight mode or "FLY".

This manual state selector (STOP/IDLE/FLY) thus makes it possible to indicate to an on-board engine computer in the aircraft:

to stop each engine when the selector is in the "STOP" position;

to implement the idling rating when the selector is in the "IDLE" position; and to implement a flight rating when the selector is in the "FLY" position.

Therefore, when the pilot positions the selector in the "IDLE" position, the engine computer of an engine regulates said engine so as to cause it to operate in compliance with the idling rating defined by the manufacturer.

In a first example, an engine computer regulates the first speed of rotation Ng of the gas generator of the engine.

Thus, an engine computer acts, in particular, on a fuel metering device of the engine to make the first speed of rotation Ng tend towards a setpoint speed of rotation Ng*.

That first example offers the advantage of guaranteeing a setpoint speed of rotation of the gas generator that enables some minimum amount of mechanical power to be extracted (taken off) and some minimum amount of hot air to be extracted (taken off).

Such a minimum extraction of hot air may be determined to ensure heating and/or demisting of a cabin of the aircraft.

In addition, this first example prevents any untimely takeoff of the aircraft while the idling mode is engaged. If a pilot increases the collective pitch of the blades of the rotary wing, then the power delivered by the engine does not increase. On the contrary, the second speed of rotation of the free turbine and the speed of rotation of the rotor decrease.

Since the second speed of rotation NTL of the free turbine and the first speed of rotation Ng of the gas generator vary, the noise generated by the aircraft is not controlled. In addition, the rotary wing might find itself within an operating range that might induce a phenomenon of ground resonance.

By way of a variant, in a second example, an engine computer regulates the second speed of rotation NTL of a free turbine of the engine.

Thus, an engine computer acts, in particular, on a fuel metering device of the engine to make the second speed of rotation NTL tend towards a setpoint speed of rotation NTL*.

That second example offers the advantage of ensuring a speed of rotation for the rotor of the helicopter that is constant. The above-mentioned drawbacks are then avoided.

Unfortunately, the first speed of rotation Ng can vary without said first speed being controlled by the regulation system. The first speed of rotation Ng can then become insufficient to enable a minimum amount of mechanical power to be extracted and a minimum amount of hot air to be extracted.

Finally, the setpoint used for the second speed of rotation is generally less than the nominal speed for the rotary wing in flight.

If a pilot accidentally changes the collective pitch of the blades of the rotary wing, the first speed of rotation Ng increases. The power developed by the engine is increased accordingly. The aircraft might then take off with a second speed of rotation that is potentially too low.

Therefore, that state of the art requires pilots to determine in intentional manner whether they wish to implement an idling rating via an idling mode or a flight rating via a flight mode. Depending on the aircraft, the idling rating is, in addition, implemented by regulating the speed of rotation of the gas generators of the engines or by regulating the speed of rotation of the free turbines of the engines.

In addition, if a slight increase in power is necessary for a secondary need (more heating, an increased electricity need, etc.), the pilot must switch the regulation of the engine over to the flight mode of operation.

In the aviation sector, various documents mention automated monitoring and control of operation of a power plant while idling.

Thus, Document US 2011/0208400 describes the use of a selector having an "IDLE" position and a "MAXPOWER" flight position in the context of electronic control for adjusting operation of an aircraft turboprop engine. A man-machine interface thus enables the pilot to choose a mode of operation for the turboprop, between a free power delivery mode of operation and an idling mode of operation.

Weight-on-Wheels (WoW) information from a sensor for sensing that the aircraft is on the ground is taken into account in order to define an idling rating.

Document U.S. Pat. No. 5,363,317 describes monitoring failures in a multi-engine aircraft. In the event of a failure being detected in one of the engines, the remaining engine is controlled accordingly. This leads to regulation as a function of conditions representing a flight state of the aircraft, passing either to a flight idle or to a ground idle.

Document U.S. Pat. No. 4,541,237 describes sub-idle speed control for an aircraft. Two ground idle modes are described, but the regulation according to that document makes no provision for automatic and contextual switching between idling and sub-idling modes. That document makes provision to reduce power in sub-idling mode in order to reduce the thrust from the engine.

Document U.S. Pat. No. 5,403,155 describes managing power from a helicopter turbine. To enable the pilot to pass manually between a normal state and an off state, touch interfaces are provided.

Document U.S. Pat. No. 4,500,966 describes "super contingency" control for a helicopter on which the speed of rotation of the main rotor is too low as a result of an engine failure.

Document WO 2000/039442 also describes a system for regulating an airplane or helicopter engine.

BRIEF SUMMARY OF THE INVENTION

An object of the invention is therefore to provide a method of automatically regulating an aircraft power plant, which method serves to optimize the operation of the aircraft.

The invention provides a method of automatically regulating a power plant of an aircraft in an idling mode of operation, said power plant comprising at least one turbine engine, said aircraft possibly having at least one rotary wing provided with a plurality of blades having variable pitch and driven in rotation by said power plant, it being possible for each engine to operate in an idling mode of operation and in a flight mode of operation. Each engine also comprises a gas generator and a free turbine.

Under such circumstances, during a selection stage, an idling mode of operation is selected.

For example, it is possible to move a three-position selector making it possible to select an engine-stopped mode of operation, and idling mode of operation, and a flight mode of operation.

As a variant, it is possible to operate a two-position selector for selecting an engine-stopped mode of operation or an engine-on mode of operation. The engine-on mode of operation makes it possible to select automatically the idling mode of operation or the flight mode of operation, depending on criteria defined by the manufacturer.

Furthermore, during a regulation stage, an idling mode of operation is implemented as a function of operational and hierarchically ordered conditions:

either through a first mode of regulation by regulating a first speed of rotation of the gas generator of each engine;

or through a second mode of regulation by regulating a second speed of rotation of the free turbine of each engine.

In the first mode of regulation, the flow rate of fuel delivered to the engine is increased or reduced so that the first speed of rotation tends towards a setpoint.

Conversely, in the second mode of regulation, the flow rate of fuel delivered to the engine is increased or reduced so that the second speed of rotation tends towards a setpoint.

Unlike the prior art, each engine when idling may operate in a first or a second mode of regulation, and not in only a single mode of regulation.

Under such circumstances, depending on the operational and hierarchically ordered conditions defined by the manufacturer, the engine is regulated as a function of its first or its second speed of rotation.

The invention thus makes it possible to optimize the operation of the engine while idling.

The method may also include one or more of the following additional characteristics.

For example, these operational and hierarchically ordered conditions may be selected from a list including:

generation of hot air from the engine for heating the aircraft as a function of outside conditions;

generation of electricity from the gas generator for electrically powering the aircraft;

minimization of noise emission; and minimization of fuel consumption.

It should be observed that it is also possible to establish a priority order as a function of the needs of the operator of the aircraft.

Optionally, the operational and hierarchically ordered conditions are in the following order:

generation of hot air from the engine for heating the aircraft as a function of outside conditions;

generation of electricity from the gas generator for electrically powering the aircraft;

minimization of noise emission; and minimization of fuel consumption.

It is thus possible automatically to give priority firstly to hot air generation, and then to electricity generation from the gas generator, to minimizing noise generation, and to minimizing fuel consumption.

To this end, an original first speed of rotation is determined that is to be reached for regulating the second speed of rotation at a level defined by the manufacturer in order to satisfy a first operational condition.

This level may be defined to ensure that the aircraft operates outside a ground resonance range of the rotorcraft.

In other words, the manufacturer defines a second critical speed of rotation that minimizes the risks of a ground resonance phenomenon appearing.

As a function of the outside conditions, the first original speed of rotation is deduced automatically.

Under such circumstances, a target is determined for the electricity level to be delivered by the power plant of the engine in order to satisfy a second operational condition. For example, the electric current consumed by the aircraft is determined. It can be understood that the second operational condition is considered as being more important than the first operational condition.

Each engine must then deliver a target current equal to said consumed electric current divided by the number of engines, for example.

If the power plant cannot deliver said electricity generation target when each gas generator is operating at said first original speed of rotation, the idling mode of operation is implemented by regulating the first speed of rotation of said gas generator in the first mode of regulation.

Increasing the amount of mechanical power that is extracted to generate electricity tends to slow down the first speed of rotation of the gas generator of the engine. A reduction that is too large results in the engine being shut down.

The manufacturer thus gives preference to regulating the first speed of rotation of the gas generator in order to avoid said engine shutting down.

More precisely, if the power plant cannot deliver said electricity generation target when each gas generator is operating at said first original speed of rotation:

a setpoint hot air temperature is determined that is to be delivered for heating the aircraft in order to satisfy a third operational condition considered as being more important than the second operational condition;

a first setpoint speed of rotation is determined that makes it possible to deliver said electricity generation target;

it is determined whether the first setpoint speed of rotation makes it possible to reach the setpoint hot air temperature;

if the first setpoint speed of rotation makes it possible to reach said setpoint hot air temperature, the engine is controlled in order to maintain the first speed of rotation equal to the first setpoint speed of rotation in the second mode of regulation; and if the first setpoint speed of rotation does not make it possible to reach said setpoint hot air temperature, the engine is controlled in order to maintain the first speed of rotation equal to a first target speed of rotation making it possible to reach said setpoint hot air temperature.

Conversely, if the power plant can deliver said electricity generation target when each gas generator is operating at said first original speed of rotation:

a setpoint hot air temperature is determined that is to be delivered for heating the aircraft in order to satisfy a third operational condition;

if the first original speed of rotation makes it possible to reach said setpoint hot air temperature, the engine is controlled in order to maintain the second speed of rotation equal to said level; and if the first original speed of rotation does not make it possible to reach said setpoint hot air temperature, the first setpoint speed of rotation making it possible to reach said setpoint hot air temperature is determined, and then the engine is controlled in order to maintain the first speed of rotation equal to the first setpoint speed of rotation.

In another aspect, it is possible to implement inhibit means for inhibiting the first mode of regulation.

If the operator of the aircraft wishes to minimize the noise and/or the fuel consumption of the aircraft to the detriment of charging the on-board batteries or to the detriment of the inside temperature, forced manual selection of the second mode of regulation can thus be implemented.

In addition, it is possible to implement a stop for limiting torque developed by an outlet shaft of said engine when the engine is operating in the idling mode of operation.

The stop prevents each engine from delivering torque greater than or equal to the torque necessary for the aircraft to take off at its minimum weight.

Thus, there is no risk of the second mode of regulation inducing accidental takeoff.

Two approaches are then possible:

either the torque limit is implemented in conservative manner so as to prevent takeoff under the conditions that are most favorable to takeoff (very dense air, low altitude, and low temperature);

or the torque limit is computed on the basis of the outside pressure and outside temperature information.

The second approach can be necessary when the torque necessary for takeoff under favorable conditions (cold weather, low altitude) is less than the torque necessary for maintaining an idling rating under unfavorable conditions (hot weather, and high altitude).

The stop may be of the type implemented for flight operating ratings. The stop may then be implemented by software means, by analog means, or by hydro-mechanical means.

Although it is common to implement a torque stop when implementing a flight rating that can generate high torque in order to protect a mechanical assembly, implementing such a stop for an idling rating of an idling mode of operation in order to avoid inappropriate takeoff appears surprising.

In addition to a method, the invention also provides a regulation device for regulating a power plant of an aircraft, said power plant comprising at least one turbine engine, it being possible for each engine to operate in an idling mode of operation and in at least one flight mode of operation.

This regulation device comprises:

a selector for requesting in particular the implementation of the idling mode of operation; and a computation system connected to the selector for controlling each engine, said computation system executing stored instructions for implementing the idling mode of operation as a function of operational and hierarchical conditions:

either through a first mode of regulation by regulating a first speed of rotation Ng of said gas generator;

or through a second mode of regulation by regulating a second speed of rotation NTL of said free turbine.

This device may have one or more of the following characteristics.

For example, the calculation system may have an avionics computer connected to a determination system for determining a collective pitch of the rotary wing as well as to a determination device for determining a state in which the aircraft is standing on the ground, and to the selector, said computation system including one engine computer per engine, which computer is connected to the avionics computer.

In addition, the aircraft has an electrical network electrically powered by the power plant, and the regulation device optionally comprises a measurement system for measuring the electricity consumed by said electrical network.

In addition, the regulation device may further comprise a measurement device for measuring the conditions of the surroundings outside the aircraft in order to determine a setpoint hot air temperature for heating the aircraft.

In addition, it is possible to implement inhibit means for inhibiting a first mode of regulation of an idling mode of operation.

Finally, the invention provides an aircraft provided with a power plant comprising at least one turbine engine, said aircraft possibly having at least one rotary wing provided with a plurality of blades having variable pitch and driven in rotation by said power plant, it being possible for each engine to operate in an idling mode of operation and in at least one flight mode of operation.

This aircraft then includes a regulation device of the above-described type.

BRIEF DESCRIPTION OF THE SEVERAL VIEWS OF DRAWINGS

The invention and its advantages appear in greater detail from the following description of implementations given by way of illustration with reference to the accompanying figures, in which.

Elements present in more than one of the figures are given the same references in each of them.

DETAILED DESCRIPTION OF THE INVENTION

Figure 1:
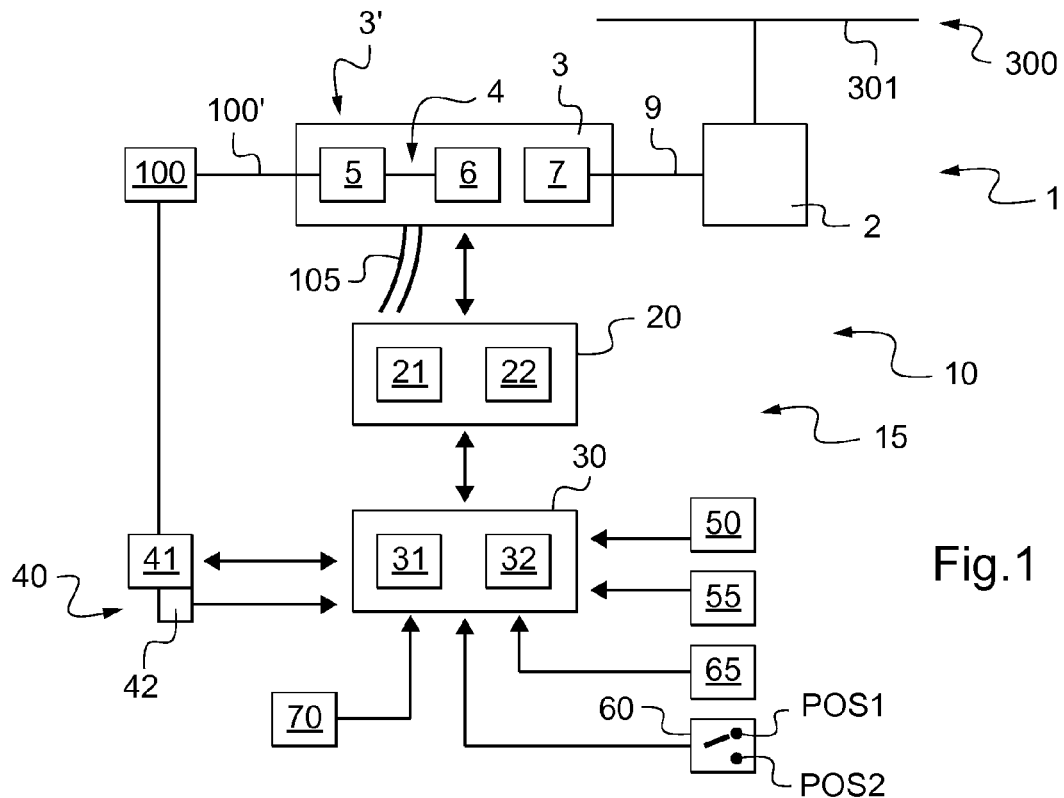
FIG. 1 is a view of an aircraft of the invention.

FIG. 1 shows an aircraft 1 provided with a rotary wing 300.

The aircraft 1 includes a power plant 3'. This power plant 3' includes at least one turbine engine 3 for driving the rotary wing 300 via a main gearbox 2.

Each engine has a gas generator 4 and a free turbine 7. For example, the gas generator comprises a compressor 5 co-operating with a high-pressure turbine 6 that is arranged upstream from the free turbine 7.

The free turbine 7 is then connected to the main gearbox via a powertrain 9. For example, this powertrain 9 may be provided with an outlet shaft that is set into rotation by the free turbine.

In addition, the aircraft is provided with mechanical power extraction (takeoff) means 100 for extracting mechanical power.

These mechanical power extraction means 100 may be constituted by electrical equipment of the electricity generator type. The mechanical power extraction means 100 are then driven in rotation by the gas generator 4 via a shaft 100'.

The mechanical power extraction means 100 can thus operate in a motor mode in order to perform a starter function.

The mechanical power extraction means 100 then communicate electrically with an electrical network 40 of the aircraft, e.g. with an "electrical core" 41.

In addition, the aircraft is provided with air extraction means 105 for extracting hot air from each engine.

The aircraft 1 is also provided with a regulation device 10.

Thus during a selection step STP0, a pilot operates a selector in particular in order to request implementation of an idling mode of operation.

By way of example, the pilot operates a two-position selector either to stop each engine or to set each engine 3 into operation.

With reference to FIG. 1, the regulation device 10 then includes a selector 60 having a first position POS1 requesting each engine 3 to stop and a second position POS2 requesting each engine 3 to operate.

To this end, the regulation device 10 is provided with a computation system 15 connected to the selector 60 for the purpose of controlling each engine 3.

This computation system includes at least one computation member that executes instructions stored in a non-volatile memory on a storage medium for the purposes of stopping the engines or of causing them to operate.

Figure 2:
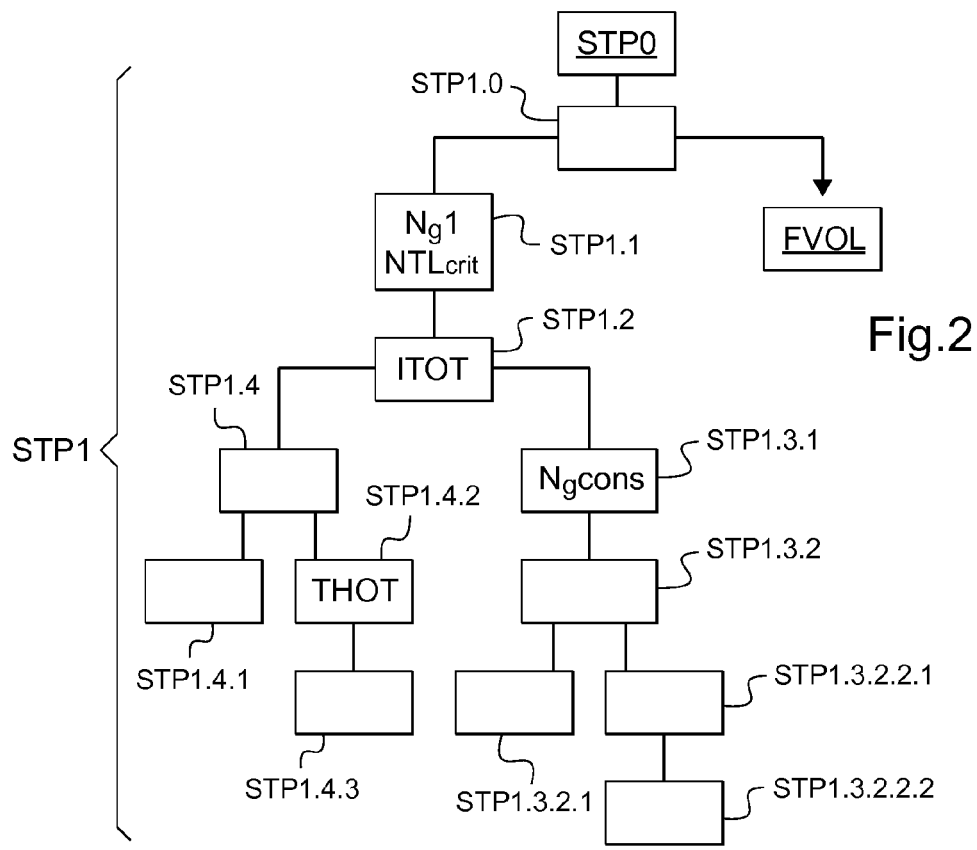
FIG. 2 is a diagram explaining the method of the invention.

With reference to FIG. 2, during a regulation step STP1, each engine 3 is controlled automatically so as to implement the idling mode of operation of the engines 3 if the collective pitch CLP of the blades 301 of the rotary wing is less than a threshold and if the aircraft 1 is standing on the ground.

During a selection substep STP1.0, it is verified whether the following two criteria are satisfied:

the collective pitch CLP of the blades 301 is less than a threshold; and the aircraft 1 is standing on the ground.

The criterion relating to the state in which the aircraft is standing on the ground may, in addition, be associated with a delay time.

If one of the two criteria is not satisfied, the computation system 15 requests a flight mode of operation FVOL to be implemented.

Conversely, if both of the criteria are satisfied, the computation system 15 automatically requests the engines 3 to operate in an idling mode of operation.

With reference to FIG. 1, the regulation device then includes a conventional determination system 50 for determining the collective pitch of the blades and a conventional determination device 55 for determining a state in which the aircraft is standing on the ground.

Reference may be made to the literature in order to obtain information about such a determination system 50 and such a determination device 55.

The computation system 15 is then connected to the determination system 50 as well as to the determination device 55 and to the selector 60, the computation system 15 executing instructions stored in a memory for the purpose of automatically implementing the idling mode of operation in each engine 3 if a collective pitch CLP of the blades 301 is less than a threshold and if the aircraft 1 is standing on the ground.

The computation system 15 may have one engine computer 20 per engine, such as an engine computer of the "Full Authority Digital Engine Control" ("FADEC") type.

This engine computer 20 then has a computation unit 21 and a memory 22 storing instructions that can be executed by the computation unit 21.

In addition, the computation system 15 may be provided with an avionics computer 30 provided with a computation member 31 and with storage means 32 that store instructions. The avionics computer 30 is then connected to the determination system 50 as well as to the determination device 55 and to the selector 60.

If the two above-explained criteria are satisfied, the avionics computer 30 then sends a request for operating in an idling mode of operation to each engine computer 20. Each engine computer then regulates the associated engine in order to satisfy that request.

In usual manner, the engine computer controls the position of a fuel metering device of the engine for the purpose of controlling operation of the engine 3.

As a variant, the selector may include a position dedicated to the idling mode of operation.

Independently of the method applied to request idling operation of the engines of the aircraft, each engine computer can regulate the idling rating of the associated engine automatically as a function of operational and hierarchically ordered conditions:

either through a first mode of regulation by regulating a first speed of rotation Ng of the gas generator 4;

or through a second mode of regulation by regulating a second speed of rotation NTL of the free turbine 7 of the engine.

To this end, the computer may take into consideration generation of hot air, then generation of electricity from mechanical power extraction means, noise generation, and fuel consumption. The aircraft 1 thus includes a calculation system 15 having a processor or the equivalent that executes stored instructions for automatically implementing at least one idling mode of operation of said engine 3.

With reference to FIG. 2, during a first optimization substep STP 1.1 of the idling mode of operation, an original first speed of rotation Ng1 is determined that is to be reached for regulating the second speed of rotation at a level NTLcrit defined by the manufacturer. For example, this level NTLcrit is defined to ensure that the aircraft 1 operates outside a ground resonance range, and/or to satisfy operational conditions. At this stage, said level may, for example, be established in order to minimize the noise generation and the fuel consumption of the engines.

With reference to FIG. 1, the regulation device may include a measurement device 65 for measuring outside conditions of the surroundings in order to determine the altitude of the aircraft and/or the outside pressure, and the outside temperature.

The avionics computer 30 can then transmit the measurements taken to each engine computer 20.

Each engine computer 20 then has, in a memory 22, at least one relationship giving the original speed of rotation Ng1 as a function of said level and of said conditions of the surroundings. Such relationships are established by the manufacturer, e.g. by testing.

By using the measurements taken, the avionics computer deduces the first original speed of rotation Ng1.

In addition, with the aircraft 1 having an electrical network 40 powered electrically by the power plant 3', the regulation device 10 includes a measurement system 42 for measuring the electricity consumed by the electrical network 40.

During a second optimization substep STP1.2 that serves to take into consideration an operational condition of the electricity generation type, the avionics computer 30 can determine the magnitude of the electric current consumed by the aircraft. Said avionics computer 30 deduces therefrom an electricity generation target ITOT that each engine should supply through the associated mechanical power extraction means. The electricity generation target is optionally evaluated in terms of target electric current to be delivered.

The avionics computer gives said electricity generation target ITOT to each engine computer 20.

The engine computer 20 of each engine uses a mathematical model established by the manufacturer, by tests or by some equivalent means and stored in a memory to determine whether the first original speed of rotation Ng1 is sufficient to enable the electricity generation target to be generated.

If it is not sufficient, the idling mode of operation should be managed through regulating the first speed of rotation Ng of the gas generator.

Then, during a substep STP1.3.1, the engine computer uses the stored mathematical model to determine a first setpoint speed of rotation Ngcons making it possible to deliver the required electricity generation target.

In addition, using the measured outside temperature and by means of a stored thermal model established by the manufacturer, the engine computer determines, during a substep STP1.3.2, a setpoint hot air temperature THOT to be delivered in order to heat the aircraft and that serves to take into consideration an operational condition of the hot air generation type. The engine computer deduces therefrom whether the first setpoint speed of rotation makes it possible to reach said setpoint hot air temperature.

During a substep STP1.3.2.1, if the first setpoint speed of rotation does make it possible to reach said setpoint hot air temperature, the engine computer controls the flow rate of fuel delivered to the engine in order to maintain the first speed of rotation equal to the first setpoint speed of rotation Ngcons.

Conversely, during a substep STP1.3.2.2.1, if the first setpoint speed of rotation Ngcons does not make it possible to reach said setpoint hot air temperature THOT, the engine computer determines a first target speed of rotation Ngcib1 making it possible to reach said setpoint hot air temperature.

During a substep STP1.3.2.2.2, the engine computer controls the flow rate of fuel delivered to the engine in order to maintain the first speed of rotation Ng equal to the new first target speed of rotation Ngcib1.

In addition, if the first original speed of rotation Ng1 of an engine is sufficient to enable the electricity generation target to be generated, then, during an optimization substep STP1.4, the engine computer determines a setpoint hot air temperature THOT to be delivered to heat the aircraft, and whether the first original speed of rotation Ng1 makes it possible to reach said setpoint hot air temperature.

During a substep STP1.4.1, if the first original speed of rotation Ng1 makes it possible to reach the setpoint hot air temperature THOT, the engine computer 20 of an engine controls the flow rate of fuel delivered to the engine in order to maintain the second speed of rotation NTL of the engine equal to said level NTLcrit.

Conversely, if the first original speed of rotation Ng1 does not make it possible to reach said setpoint hot air temperature THOT, then, during a substep STP1.4.2, the engine computer of each engine determines a first setpoint speed of rotation Ngcons making it possible to reach said setpoint hot air temperature.

During a substep 1.4.3, the engine computer controls the flow rate of fuel delivered to the engine in order to maintain the first speed of rotation Ng equal to the first setpoint speed of rotation Ngcons.

With reference to FIG. 1, the regulation device may also include inhibit means 70 for inhibiting the first mode of regulation.

In addition, each engine computer may be connected to measurement means for measuring the torque exerted on the outlet shaft of the associated engine.

Each engine computer has a stop, e.g. a software stop, so as to limit said torque to a maximum torque defined by the manufacturer. Thus, each engine computer limits the flow rate of fuel delivered to the engine in order to comply with said stop.

Naturally, the present invention may be subjected to numerous variant implementations. Although several implementations are described, it should readily be understood that it is not conceivable to identify exhaustively all possible variants. Naturally, it is possible to replace any described component with equivalent means without going beyond the ambit of the present invention.

What is claimed is:

1. A method of automatically regulating a power plant of an aircraft having a turbine engine, the engine being operable in an idling mode of operation and having a gas generator and a free turbine, the method comprising:
    during a selection step (STPO); selecting that the engine be operated in the idling mode of operation;
    during a regulation step (STP1), while the engine is selected to be operated in the idling mode of operation and the aircraft is standing on the ground, implementing the idling mode of operation and operating the engine in compliance with the idling mode of operation;
    wherein operating the engine in compliance with the idling mode of operation during the regulation step (STP1) includes automatically regulating either a first speed of rotation (Ng) of the gas generator of the engine through a second mode of regulation depending on operational and hierarchically ordered conditions; and
    during the regulation step (STP1) while the idling mode of operation is implemented, determining an original gas generator speed of rotation level (Ng1) that is to be reached by the gas generator for regulating the speed of rotation (NTL) of the free turbine at a critical free turbine speed of rotation level (NTLcrit) defined by a manufacturer in order to satisfy a first one of the operational and hierarchical ordered conditions;
    determining an electricity generation target (ITOT) that the power plant is to deliver in order to satisfy a second one of the operational and hierarchically ordered conditions; and
    when the power plant cannot deliver the electricity generation target while the gas generator is operating at the first original gas generator speed of rotation level (Ng1), operating the engine in compliance with the idling mode of operation by automatically regulating the speed of rotation (Ng) of the gas generator.

2. The method according to claim 1, further comprising selecting the operational and hierarchically ordered conditions from a list of operational conditions, the list of operational conditions including:
    generation of hot air from the engine for heating the aircraft as a function of outside conditions;
    generation of electricity from the gas generator for electrically powering the aircraft;
    minimization of noise emission; and
    minimization of fuel consumption.

3. The method according to claim 2, further comprising establishing the hierarchical order of the operational and hierarchically ordered conditions as a function of needs defined by an operator of the aircraft.

4. The method according to claim 1, wherein the operational and hierarchically ordered conditions include the following operational conditions in the following hierarchical order:
    generation of hot air from the engine for heating the aircraft as a function of outside conditions;
    generation of electricity from the gas generator for electrically powering the aircraft;
    minimization of noise emission; and
    minimization of fuel consumption.

5. The method according to claim 1, wherein the critical free turbine speed of rotation level (NTLcrit) is defined to ensure that the aircraft operates outside a ground resonance range by minimizing noise emission and fuel consumption by the engine.

6. The method according to claim 1, wherein during the regulation step (STP1) while the idling mode of operation is implemented and the power plant cannot deliver the electricity generation target (ITOT) while the gas generator is operating at the original gas generator speed of rotation level (Ng1), the method further comprising:
    determining a setpoint hot air temperature (THOT) that is to be delivered for heating the aircraft in order to satisfy a third one of the operational and hierarchically ordered conditions;
    determining a setpoint gas generator speed of rotation (Ngcons) that makes it possible to deliver the electricity generation target (ITOT);
    determining whether the setpoint gas generator speed of rotation (Ngcons) makes it possible to reach the setpoint hot air temperature (THOT);
    when the setpoint gas generator speed of rotation (Ngcons) makes it possible to reach the setpoint hot air temperature, operating the engine in compliance with the idling mode of operation by automatically regulating the speed of rotation (Ng) of the gas generator in order to maintain the speed of rotation (Ng) of the gas generator equal to the setpoint gas generator speed of rotation (Ngcons); and
    when the setpoint gas generator speed of rotation (Ngcons) does not make it possible to reach the setpoint hot air temperature (THOT), operating the engine in compliance with the idling mode of operation by automatically regulating the speed of rotation (Ng) of the gas generator in order to maintain the speed of rotation (Ng) of the gas generator equal to a target gas generator speed of rotation that makes it possible to reach the setpoint hot air temperature (THOT).

7. The method according to claim 1, wherein during the regulation step (STP1) while the idling mode of operation is implemented and the power plant can deliver the electricity generation target (ITOT) while the gas generator is operating at the original gas generator speed of rotation level (Ng1), the method further comprising:
    determining a setpoint hot air temperature (THOT) that is to be delivered for heating the aircraft in order to satisfy a third one of the operational and hierarchically ordered conditions;
    when the original gas generator speed of rotation level (Ng1) makes it possible to reach the setpoint hot air temperature (THOT), operating the engine in compliance with the idling mode of operation by automatically regulating the speed of rotation (NTL) of the free turbine in order to maintain the speed of rotation (NTL) of the free turbine equal to the critical free turbine speed of rotation level (NTLcrit); and
    when the original gas generator speed of rotation level (Ng1) does not make it possible to reach the setpoint hot air temperature (THOT), determining a setpoint gas generator speed of rotation (Ngcons) that makes it possible to reach the setpoint hot air temperature (THOT) and then operating the engine in compliance with the idling mode of operation by automatically regulating the speed of rotation (Ng) of the gas generator in order to maintain the speed of rotation (Ng) of the gas generator equal to the setpoint gas generator speed of rotation (Ngcons).

8. The method according to claim 1, further comprising inhibiting the first mode of regulation in response to a manual selection of the second mode of regulation.

9. The method according to claim 1, further comprising implementing a stop to limit torque developed by an outlet shaft of the engine when the engine is operating in the second mode of regulation.

10. A method of automatically regulating a power plant of an aircraft having a turbine engine, the engine being operable in an idling mode of operation and having a gas generator and a free turbine, the method comprising:

during a selection step (STPO), selecting that the engine be operated in the idling mode of operation;

during a regulation step (STP1), while the engine is selected to be operated in the idling mode of operation and the aircraft is standing on the ground, implementing the idling mode of operation and operating the engine in compliance with the idling mode of operation;

wherein operating the engine in compliance with the idling mode of operation during the regulation step (STP1) includes automatically regulating a speed of rotation (Ng) of the gas generator of the engine through a first mode of regulation and a speed of rotation (NTL) of the free turbine of the engine through a second mode of regulation as a function of heating, electricity generation, noise emission, and fuel consumption operational and hierarchically ordered conditions; and during the regulation step (STP1) while the idling mode of operation is implemented, determining an original gas generator speed of rotation level (Ng1) that is to be reached by the gas generator for regulating the speed of rotation (NTL) of the free turbine at a critical free turbine speed of rotation level (NTLcrit) defined by a manufacturer in order to satisfy a first one of the operational and hierarchical ordered conditions;

determining an electricity generation target (ITOT) that the power plant is to deliver in order to satisfy a second one of the operational and hierarchically ordered conditions; and when the power plant cannot deliver the electricity generation target while the gas generator is operating at the first original gas generator speed of rotation level (Ng1), operating the engine in compliance with the idling mode of operation by automatically regulating the speed of rotation (Ng) of the gas generator.

11. The method according to claim 10, further comprising establishing the hierarchical order of the operational and hierarchically ordered conditions as a function of needs defined by an operator of the aircraft.

12. The method according to claim 10, further comprising inhibiting the first mode of regulation in response to a manual selection of the second mode of regulation.

13. The method according to claim 10, further comprising implementing a stop to limit torque developed by an outlet shaft of the engine when the engine is operating in the second mode of regulation.

* * * * *